United States Patent
Sakashita et al.

(10) Patent No.: US 12,420,421 B2
(45) Date of Patent: Sep. 23, 2025

(54) SIMULATION DEVICE, SIMULATION SYSTEM, AND SIMULATION METHOD

(71) Applicant: TOYOTA JIDOSHA KABUSHIKI KAISHA, Toyota (JP)

(72) Inventors: Takunori Sakashita, Toyota (JP); Tatsuzo Suzuki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 18/423,459

(22) Filed: Jan. 26, 2024

(65) Prior Publication Data

US 2024/0278427 A1     Aug. 22, 2024

(30) Foreign Application Priority Data

Feb. 22, 2023   (JP) .................................. 2023-025958

(51) Int. Cl.
*B25J 9/16*     (2006.01)

(52) U.S. Cl.
CPC .................................. *B25J 9/1671* (2013.01)

(58) Field of Classification Search
CPC ......... B25J 9/1671; G06T 17/00; G06T 19/20
See application file for complete search history.

(56) References Cited

U.S. PATENT DOCUMENTS

| | | | |
|---|---|---|---|
| 6,337,552 B1 * | 1/2002 | Inoue | B25J 13/00 318/568.1 |
| 6,438,457 B1 * | 8/2002 | Yokoo | A63F 13/005 700/86 |
| 6,442,450 B1 * | 8/2002 | Inoue | B25J 13/00 700/263 |
| 6,697,708 B2 * | 2/2004 | Takagi | G06N 3/008 901/1 |
| 6,845,297 B2 * | 1/2005 | Allard | G05D 1/0038 600/595 |
| 6,862,497 B2 * | 3/2005 | Kemp | B62D 57/032 700/86 |
| 7,027,963 B2 * | 4/2006 | Watanabe | B25J 9/1671 700/182 |
| 7,027,965 B2 * | 4/2006 | Hannaford | G05B 5/01 703/2 |
| 7,089,083 B2 * | 8/2006 | Yokoo | G06N 3/006 901/1 |
| 7,117,190 B2 * | 10/2006 | Sabe | G06N 3/008 706/45 |

(Continued)

FOREIGN PATENT DOCUMENTS

JP         2021-045797 A    3/2021

*Primary Examiner* — Bhavesh V Amin
(74) *Attorney, Agent, or Firm* — Oliff PLC

(57) ABSTRACT

A simulation device comprises a drawing unit configured to draw a virtual facility corresponding to a facility in a virtual space, the virtual facility having a virtual movable portion corresponding to a movable portion of the facility; and a calculation unit configured to compute a physical quantity including a moment of inertia acting on the movable portion when operating the movable portion and to repeatedly calculate an operation speed of the virtual movable portion using the calculated physical quantity. The drawing unit draws a motion of the virtual movable portion using the calculated operation speed of the virtual movable portion.

5 Claims, 4 Drawing Sheets

(56) References Cited

U.S. PATENT DOCUMENTS

| | | | | |
|---|---|---|---|---|
| 7,298,385 | B2* | 11/2007 | Kazi | B25J 9/1671 700/254 |
| 7,353,081 | B2* | 4/2008 | Skourup | B25J 9/1664 700/264 |
| 7,353,082 | B2* | 4/2008 | Pretlove | G05B 19/42 700/264 |
| 8,706,295 | B2* | 4/2014 | Park | G06N 3/008 700/250 |
| 11,112,776 | B2* | 9/2021 | Keselman | B21D 43/105 |
| 11,207,774 | B2* | 12/2021 | Hayashi | G05D 1/0044 |
| 11,498,206 | B2* | 11/2022 | Yanase | B25J 11/001 |
| 2002/0062176 | A1* | 5/2002 | Fujita | B25J 9/1605 700/245 |
| 2002/0183895 | A1* | 12/2002 | Kaplan | A63H 11/00 700/245 |
| 2003/0045203 | A1* | 3/2003 | Sabe | G06N 3/008 446/356 |
| 2003/0216834 | A1* | 11/2003 | Allard | B25J 9/1689 700/245 |
| 2005/0197739 | A1* | 9/2005 | Noda | B25J 11/001 700/245 |
| 2006/0161300 | A1* | 7/2006 | Gonzalez-Banos | B25J 9/161 700/245 |
| 2006/0287772 | A1* | 12/2006 | Sandner | B25J 9/1671 700/253 |
| 2007/0073442 | A1* | 3/2007 | Aghili | B25J 9/1605 700/245 |
| 2007/0213874 | A1* | 9/2007 | Oumi | B25J 9/1697 700/245 |
| 2007/0282485 | A1* | 12/2007 | Nagatsuka | G05B 19/4069 700/245 |
| 2008/0161677 | A1* | 7/2008 | Sutherland | A61B 34/71 606/41 |
| 2009/0082879 | A1* | 3/2009 | Dooley | G06N 3/004 700/3 |
| 2009/0234788 | A1* | 9/2009 | Kwok | G06N 3/006 718/1 |
| 2010/0145514 | A1* | 6/2010 | Kim | B25J 9/161 700/248 |
| 2012/0150352 | A1* | 6/2012 | Park | B25J 9/1689 901/50 |
| 2018/0297202 | A1* | 10/2018 | Nishitani | G06F 30/20 |
| 2022/0292234 | A1 | 9/2022 | Iwamura | |
| 2024/0278427 | A1* | 8/2024 | Sakashita | B25J 9/1671 |

* cited by examiner

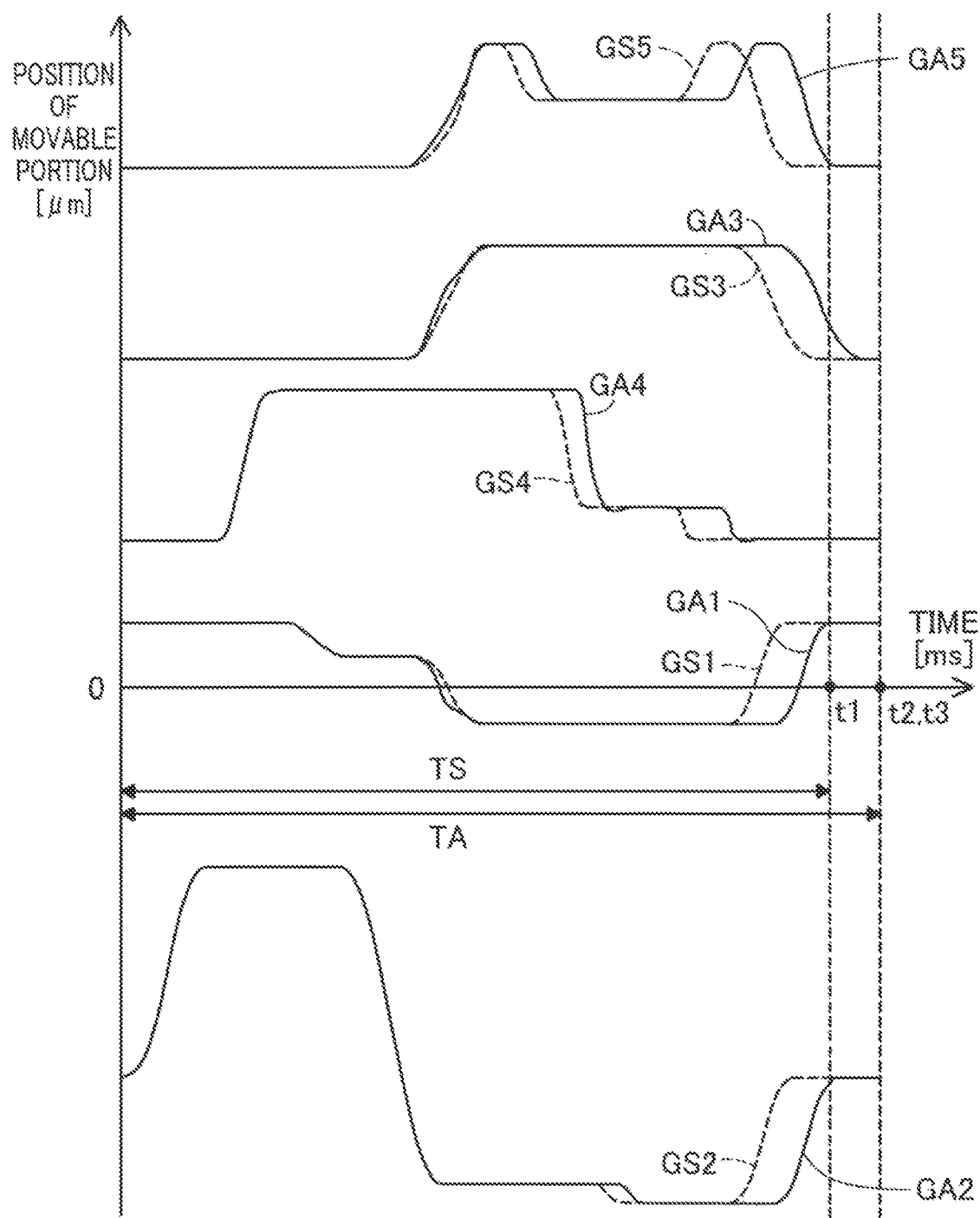

SIMULATION DEVICE, SIMULATION SYSTEM, AND SIMULATION METHOD

CROSS REFERENCE TO RELATED APPLICATIONS

This application is based upon and claims benefit of priority from Japanese Patent Application No. 2023-025958, filed on Feb. 22, 2023, the entire contents of which are incorporated herein by reference.

BACKGROUND

Field

The present disclosure relates to simulation devices, simulation systems, and simulation method.

Related Art

For example, JP2021-045797A discloses a simulation device in which the physical simulator calculates the behavior of the virtual object corresponding to the robot hand mounted on the robot after the robot emulator calculates the behavior of the virtual object disposed in the virtual space. In this simulation device, the physical simulator and the robot emulator are synchronized to estimate the tact time.

However, with the conventional technique, the reproducibility of the behavior of the virtual object to the behavior of the actual robot is reduced, and accurate simulation results may not be obtained.

SUMMARY

The present disclosure may be implemented as a following aspect.

According to one aspect of the present disclosure, there is a provided a simulation device. The simulation device comprises: a drawing unit configured to draw a virtual facility corresponding to a facility in a virtual space, the virtual facility having a virtual movable portion corresponding to a movable portion of the facility; and a calculation unit configured to compute a physical quantity including a moment of inertia acting on the movable portion when operating the movable portion and to repeatedly calculate an operation speed of the virtual movable portion using the calculated physical quantity. The drawing unit draws a motion of the virtual movable portion using the calculated operation speed of the virtual movable portion.

BRIEF DESCRIPTION OF THE DRAWINGS

FIG. 4 is an explanatory view showing an example of a change in the operation speed with respect to the operation time of the virtual movable portion.

DETAILED DESCRIPTION

A. First Embodiment

Figure 1:
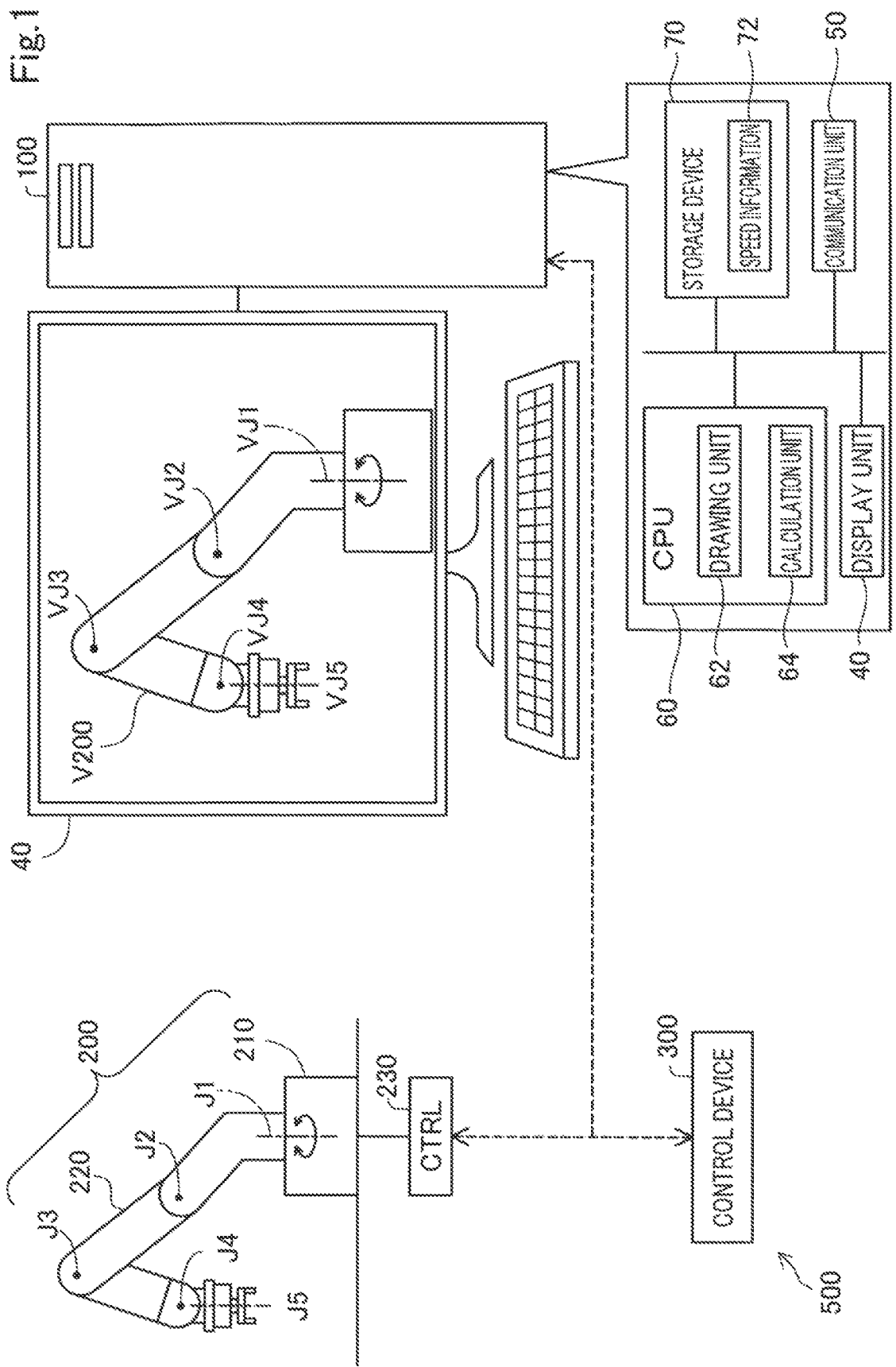
FIG. 1 is an explanatory view showing a schematic configuration of a simulation device as a first embodiment.

FIG. 1 is an explanatory diagram illustrating a schematic configuration of a simulation system 500 including a simulation device 100 as a first embodiment of the present disclosure. The simulation system 500 includes a simulation device 100 and a controller 300. Simulation device 100 is, for example, a product-design-verification-system (VPS: Virtual Product Simulator) with a three-dimensional modeling. The simulator 100 draws a virtual robot V200 corresponding to the actual robot 200 in the virtual space by a so-called digital mock-up (Digital Mock-Up). In the simulation device 100, by using the virtual robot V200, verification of the logic of the control program, risk-based verification such as malfunction or interference-checking of the robot 200, and debug verification can be performed on the virtual space. For example, by performing a simulation before fabricating the robot 200, it is possible to reduce the risk of damage or malfunction when fabricating the robot 200. Further, when fabricating the robot 200, a correction of the robot 200, and a correction of the control program alternately, it is possible to suppress the so-called hand return.

The robot 200 includes a base 210, a robot arm 220 attached to the base 210, and a robot control unit 230 for controlling the robot 200. The robot 200 is an example of facilities to be simulated by the simulation device 100. The arm end which is the distal end portion of the robot arm 220, the robot hand as an end effector is mounted. The robot 200 performs the task of gripping a workpiece with the robot hand and moving the robot arm 220 to place it at another location.

Robotic arm 220, for example, are sequentially connected by five movable portion J1, J2, J3, J4, J5. The movable part J1-J5 is an example of an actuator and performs rotary motion rotating around a drive shaft using a servo motor. The movable part J1, J5 is a torsional joint and the movable part J2, J3, J4 is a bending joint. In the present embodiment, as an example of a facility, a five-axis robot is shown, but a robot having an arbitrary robot arm mechanism having a single number or two or more joints may be used. A facility other than robots, such as transport facility and processing facility, may be used for the facility.

A virtual robotic V200 is an example of a virtual facility. The virtual robot V200 is generated using a motor definition, a sensor definition, or the like of the robot 200. Virtual robotic V200 is provided with a virtual movable part VJ1, VJ2, VJ3, VJ4, VJ5 corresponding to the movable part J1-J5.

The controller 300 is a programmable logic controller (PLC), which is composed of an arithmetic unit, an input unit, and an output unit. Controller 300, via the robot controller 230, controls the operation of the movable portion J1-J5 of the robot 200.

The simulating device 100 is constituted by a computer including a display unit 40, a communication unit 50, an CPU 60 serving as a central processing unit, and a storage device 70. CPU 60, the storage device 70, the communication unit 50, and the display unit 40 are connected to each other through an internal bus or an interface circuit. The display unit 40 is, for example, a liquid crystal display or an organic EL display and displays a virtual robotic V200 on a virtual space. The communication unit 50 is a communication device for communicating with an external device such as the control device 300.

Storage device 70 may be, for example, a RAM, ROM, a hard disk drive (HDD), a solid state drive (SSD), or the like. The storage device 70, various programs for realizing the functions provided in the present embodiment are stored. By executing a program in which CPU 60 is stored in the storage device 70, some or all of the functions of the drawing unit 62 and the calculation unit 64 are realized. However, some or all of the functions of the drawing unit 62 and the calculation unit 64 may be realized by a hardware circuit. The storage device 70, as described later, the speed information 72 is stored relating to the speed of the virtual movable portion.

The drawing unit 62 draws the virtual robot V200 corresponding to the robot 200 in the virtual space. In the present exemplary embodiment, the drawing unit 62 generates the operation of the virtual robot V200 in which the robot 200 is simulated on the virtual space according to the control signal generated by the control device 300. The drawing unit 62 may draw the virtual robotic V200 according to a control signal generated by other than the control device 300. In this case, the control signal indicates the same contents as the control signal control device 300 generates.

The calculation unit 64 computes the operation speed of the virtual movable portion VJ1-VJ5 of the virtual robotic V200. The calculation unit 64 repeatedly calculates the operation speed of the virtual movable portion VJ1-VJ5 every unit time. In the present embodiment, the calculation unit 64 further computes the physical quantity including the moment of inertia acting on the movable portion J1-J5 in order to utilize the torque-control and the angle-control and computes the operation speed of the virtual movable portion VJ1-VJ5. The "physical quantity" is, for example, the mass of the movable part J1-J5, the gravitational force acting on the movable part J1-J5, the inertial force, the moment of inertia, the kinetic energy, and the frictional force. Frictional force is, for example, a frictional force acting on the movable portion J1-J5 when operating the movable portion J1-J5. Specifically, the frictional force includes a frictional force generated between the arm or the like in contact with the movable portion J1-J5 and the movable portion J1-J5, and a frictional force generated in the servo motor when the servo motor rotates. The physical quantities used in the simulation are preferably all of mass, gravity, friction, inertia, moment of inertia, and kinetic energy. However, in order to reduce the calculation load of the calculation unit 64, for example, only the moment of inertia, and kinetic energy calculated by utilizing this may be used, only the moment of inertia may be used.

When defining one axis with respect to the virtual movable portion VJ1-VJ5, the moment of inertia I around the axis, for example, is calculated by using the following equation (1).

$$I = \sum_i m_i r_i^2 \quad \text{Equation (1)}$$

mi: Mass of mass point
ri: Distance between mass point and shaft

When an angular speed is "ω" and a speed of the mass point is "vi=ri·ω", a kinetic energy for each mass point is "τi=½·(mi·vi²)=½·mi·(ri)²·ω²". Therefore, the kinetic energy T of the virtual movable part VJ1-VJ5, using the following equation (2), can be determined by the sum of the angular momentum of the mass point.

$$T = \sum_i \tau_i = \frac{1}{2} \sum_i m_i r_i^2 \omega^2 = \frac{1}{2} I \omega^2 \quad \text{Equation (2)}$$

Figure 2:
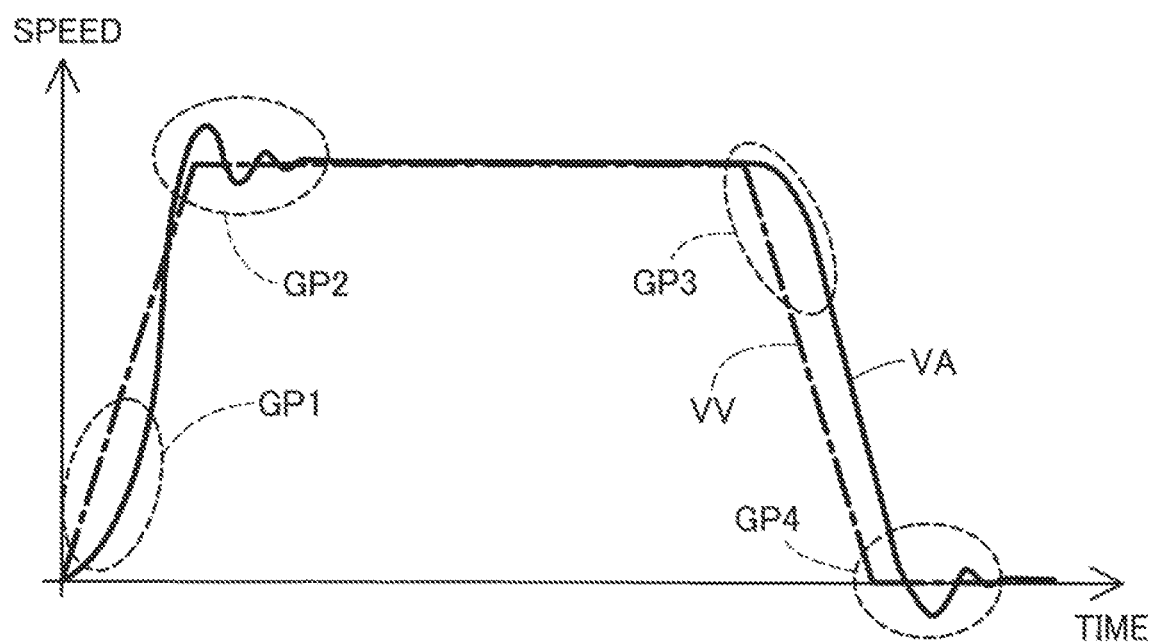
FIG. 2 is an explanatory diagram showing a simulation result by the virtual robot as a comparative example without using physical quantities and the measured value by the robot.

FIG. 2 is an explanatory diagram illustrating a simulation result VV by the virtual robot V200 as a comparative example in which a physical quantity is not used, and an actual measured value VA by the robot 200. In the graph shown in FIG. 2, the horizontal axis is a time axis, the vertical axis represents the operation speed of the virtual movable portion and the movable portion. In FIG. 2, the change in the operation speed of the virtual movable portion and the movable portion in the operation time (also referred to as "cycle time") in which the virtual movable portion and the movable portion executes one operation is shown. The change in the operation speed of the virtual movable portion is calculated by the calculation unit 64 and is stored as the speed information 72 of the storage device 70. As a result of the simulation, the drawing unit 62 displays a change in the operation speed of the virtual movable portion shown in FIG. 2 on the display unit 40. However, the simulation result by the drawing unit 62 may not be displayed.

The inventors have newly found that the simulation result when the physical quantity is not used, with respect to the actual measurement VA, for example, difference GP1, GP2, GP3, GP4 shown in FIG. 2 occurs. As shown in the difference GP1, immediately after the movable part J1-J5 is driven, the actual measurement VA, by being affected by physical quantities such as frictional force and gravitational force, the timing that the operation speed starts to increase is slower than the simulation-result VV. As shown in the difference GP2, when the speed is made constant after the operating speed is accelerated to a predetermined speed, in the actual measured value VA, the operation speed is temporarily larger than the simulation result VV due to the effect of physical quantities such as inertial force, moment of inertia, etc., compared with the simulation result, it takes time to stabilize the predetermined speed.

Next, as shown in the difference GP3, when deceleration starts from a predetermined speed, the actual measurement VA is affected by physical quantities such as gravitational force, inertial force, and moment of inertia, and the timing of deceleration becomes slower than the simulation result VV. As shown in the difference GP4, when stopping after decelerating, the actual measurement VA is affected by physical quantities such as gravitational force, inertial force, and moment of inertia, and it takes longer to complete stopping operation. Thus, in the simulator of the comparative example using no physical quantity, the operation is completed at a timing earlier than the actual measured value VA. That is, the cycle time until completion from the start of the respective operations virtual movable portion is predetermined will be calculated shorter than the actual measured value. In contrast, the simulating device 100 of the present embodiment, by the calculation unit 64 repeatedly calculates the operation speed of the virtual movable portion VJ1-VJ5 for each unit time using the physical quantity, it is possible to suppress or prevent the occurrence of the above-described difference GP1, GP2, GP3, GP4.

Figure 3:
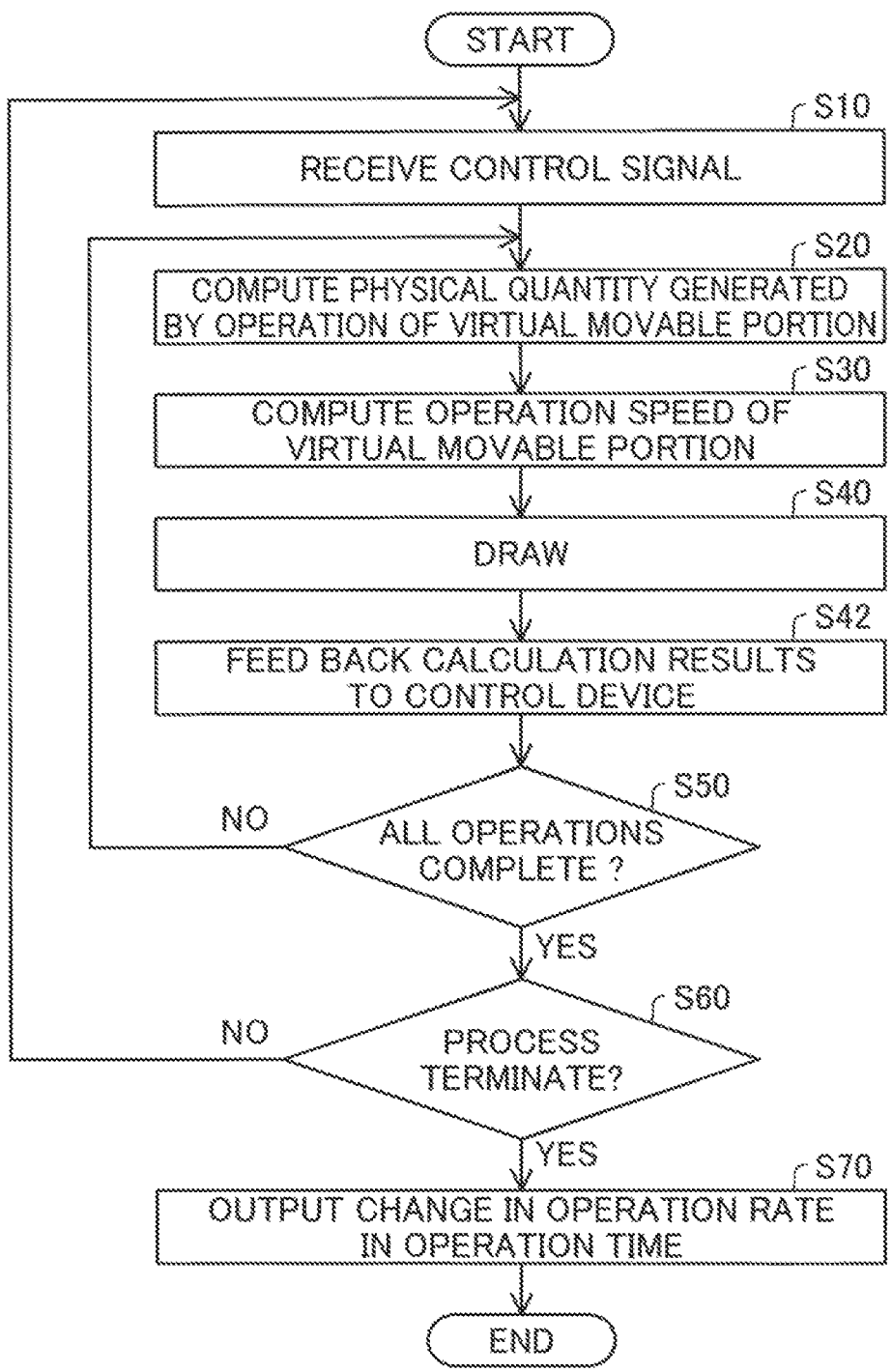
FIG. 3 is a flowchart illustrating a processing routine that is executed by the simulation device.

FIG. 3 is a flowchart illustrating a processing routine that is executed by the simulation device 100. The flow starts, for example, by the simulation device 100 receives the operation to start the simulation.

In S10, the simulator 100 receives a control signal from the controller 300. In S20, the calculation unit 64 computes the physical quantity generated by the operation of the virtual movable portion VJ1-VJ5. More specifically, the calculation unit 64 computes the moment of inertia using the above-described equation (1) and computes the kinetic energy using the above-described equation (2), while using the mass, gravity, frictional force, inertial force, and the like as the physical quantities.

In S30, the calculation unit 64 repeatedly computes the operation speed of the virtual movable portion VJ1-VJ5 in units of time using the computed physical quantity. The calculation unit 64 is not limited to the operation speed only, further may be calculated position information of the virtual movable portion VJ1-VJ5. In S40, the drawing unit 62 draws the virtual robot V200 on the virtual space such that the virtual robot V200 is driven based on the operation speed and the position information as the calculation result. In S42, the calculation unit 64 outputs the calculated operation speed and position information of the virtual movable portion VJ1-VJ5 to the control device 300 sequentially. Controller 300, the operation speed and position information of the inputted virtual movable portion VJ1-VJ5, and feeds back to the operation speed and position information of the movable portion J1-J5. Consequently, in the subsequent control, the control device 300 outputs a control signal based on the operation speed and the position information of the movable portion J1-J5 fed back.

In S50, the drawing unit 62 confirms whether or not all the operations corresponding to the received control signals have been completed. If all the operations have not been completed (S50:NO), the drawing unit 62 returns the process to S20. If all operations are completed (S50:YES), the process proceeds to S60. In S60, the drawing unit 62 confirms whether or not to terminate the process. As the end condition of the process, a case in which a control signal is not received at a predetermined time, a case in which a series of operations of a predetermined virtual robotic V200 are completed, and the like are exemplified. If the termination condition is satisfied (S60:YES), the drawing unit 62 shifts the process to S70. If the processing condition is not satisfied (S60:NO), the drawing unit 62 returns the process to S10 and waits for the reception of the control signal. In S70, the drawing unit 62 draws a change in the operation speed with respect to the calculated operation time of the virtual movable portion VJ1-VJ5 and displays it on the display unit 40.

FIG. 4 is an explanatory diagram illustrating an exemplary change in the operation speed with respect to the operation time of the virtual movable portion VJ1-VJ5. In the graph shown in FIG. 4, the horizontal axis is a time axis, the vertical axis indicates the position of the movable portion. Graphical GS1, GS2, GS3, GS4, GS5 shown by the broken line in the diagram shows the simulation results as a comparative example by the simulation device without using physical quantities. Graphical GA1, GA2, GA3, GA4, GA5 shown in solid lines show simulation outcomes by the simulation device 100 of the present embodiment. The simulated graphical GA1-GA5 and graphical GS1-GS5 correspond to the virtual mover VJ1-VJ5 of the virtual robotic V200, indicating the position change of the virtual mover VJ1-VJ5 during the cycle time. The simulation result of the cycle time shown in FIG. 4 is calculated by the calculation unit 64, and is stored as the speed information 72 of the storage device 70. In the present embodiment, the drawing unit 62 displays the simulation result of the cycle time on the display unit 40. For convenience of understanding, graphs other than graph GS1 and graph GA1 are shown shifted up and down from the graph GS1 and graph GA1. Simulation results by the drawing unit 62 may not be displayed.

As shown in the graphical GS1 in FIG. 4, in the simulation result by the simulation device of the comparative example, the time at which the operation of the virtual movable portion VJ1 is completed is a time t1. As shown in the graphical GA1, in the simulation result of the simulation device 100 of the present embodiment, the time at which the operation of the virtual movable portion VJ1 is completed is a time t2. According to the simulation device 100 of the present embodiment, the operation time TA of the movable portion J1, since the use of physical quantities, more accurate than the operation time TS in the simulation results of the comparative example. Consequently, the time t2 at which the operation is completed substantially coincides with the operation completion time t3 in the actual measurement of the robot 200.

As described above, according to the simulating device 100 of this embodiment includes a drawing unit 62 for drawing the virtual robot V200 corresponding to the robot 200 in the virtual space, and a calculation unit 64 for calculating the physical quantities such as the inertial moment acting on the movable portion J1-J5 of the robot 200 and repeatedly calculating the operation speed of the virtual movable portion VJ1-VJ5 using the calculated physical quantities are provided. The drawing unit 62 draws the motion of the virtual movable portion VJ1-VJ5 using the calculated operation speed of the virtual movable portion VJ1-VJ5. By considering the effect of a physical quantity such as a moment of inertia on the operation speed of the virtual movable portion VJ1-VJ5, the operation of the virtual robot V200 can be brought close to the operation of the actual robot 200. Therefore, it is possible to improve the reproducibility of the simulation, it is possible to improve the calculation accuracy of the cycle time and the like.

According to the simulating device 100 of the present embodiment, the physical quantities include, in addition to the moment of inertia, the gravitational force acting on the movable part J1-J5 and the frictional force acting on the movable part J1-J5 when operating the movable part J1-J5. Therefore, the operation speed of the virtual robot V200 can be made closer to the actual operation speed of the robot 200.

In the simulation device 100 of this embodiment, the change in the operation speed of the virtual movable portion VJ1-VJ5 in the operation time is calculated by the calculation unit 64, and is stored as the speed information 72 of the storage device 70. The drawing unit 62 displays the change in the operation speed of the virtual movable portion VJ1-VJ5 on the display unit 40 as a result of the simulation. According to the simulation device 100 of the present embodiment, it is possible to confirm the reproducibility with respect to the actual measured value VA at the operation speed as a simulation result VV, and it is possible to easily evaluate the simulation result.

According to the simulation system 500 of this embodiment, the drawing unit 62 draws the motion of the virtual movable portion VJ1-VJ5 using the calculated operation speed and position information of the virtual movable portion VJ1. The calculation unit 64 outputs the operation speed and the position information of the calculated virtual movable portion VJ1-VJ5 to the control device 300, the control device 300 generates a control signal reflecting the operation speed and the position information of the inputted virtual movable portion VJ1-VJ5 to the driving of the movable portion J1. Therefore, it is possible to feed back the operation speed and the position information of the virtual movable portion VJ1-VJ5 considering the effect of the physical quantity to the controller 300.

According to the simulation system 500 of this embodiment, the drawing unit 62 drives the virtual facility in a virtual space by using the control signal. The control signal is for driving the movable portion J1-J5 and outputted from the control device 300. By using the control signal used in the robot 200 as a real machine in the simulation, it is possible to perform the simulation in a simple manner without preparing separately the control signal for simulation.

The present disclosure is not limited to the above-described embodiments and can be implemented by various configurations without departing from the scope of the present disclosure. Furthermore, unless technical features are described as indispensable in the description, the technical features may be deleted as appropriate. For example, the present disclosure may be implemented as the aspect described below.

(1) According to first aspect of the disclosure, there is a provided a simulation device. The simulation device comprises: a drawing unit configured to draw a virtual facility corresponding to a facility in a virtual space, the virtual facility having a virtual movable portion corresponding to a movable portion of the facility; and a calculation unit configured to compute a physical quantity including a moment of inertia acting on the movable portion when operating the movable portion and to repeatedly calculate an operation speed of the virtual movable portion using the calculated physical quantity. The drawing unit draws a motion of the virtual movable portion using the calculated operation speed of the virtual movable portion. According to this aspect, by considering the influence of physical quantities such as moment of inertia on the operation speed of the virtual movable portion, it is possible to bring the operation of the virtual facility closer to the operation of the actual facility. Therefore, it is possible to improve the repeatability of the simulation.

(2) In the simulation device of the above aspect, the physical quantity may further include gravity acting on the movable portion and a frictional force acting on the movable portion when operating the movable portion. According to this aspect, further, by considering the gravity and frictional force, it is possible to further improve the reproducibility of the simulation.

(3) In the simulation device of the above aspect, the drawing unit may draw a change in the operation speed of the virtual movable portion during an operation time of the virtual movable portion. According to this aspect, it is possible to confirm the reproducibility with respect to the actual measured value at the operating speed as a simulation result, it is possible to easily evaluate the simulation results.

(4) According to second aspect of the disclosure, there is a provided a simulation system. The simulation system comprises: a control device configured to output a control signal for driving a movable portion of a facility; a drawing unit configured to draw a virtual facility corresponding to the facility in a virtual space, the virtual facility having a virtual movable portion corresponding to the movable portion; and a calculation unit configured to compute, based on the control signal, a physical quantity including a moment of inertia acting on the movable portion when operating the movable portion and repeatedly calculate an operation speed of the virtual movable portion using the calculated physical quantity. The drawing unit draws a motion of the virtual movable portion using the calculated operation speed of the virtual movable portion. The calculation unit outputs the calculated operation speed of the virtual movable portion to the control device. The control device generates the control signal reflecting the input operation speed of the virtual movable portion to a drive of the movable portion. According to second aspect of the disclosure, it is possible to feed back the operation speed of the virtual movable portion in consideration of the influence of the physical quantity to the control device. In addition, by using the control signals used in actual facilities for the simulation, it is possible to perform the simulation in a simple manner.

The present disclosure may be also implemented by various modes other than the simulation device. The present disclosure may be implemented as modes such as a simulation method, a control method of the facility, a control method of the simulation device, a computer program for realizing these control methods, a non-transitory recording media having this computer program recorded thereon.

What is claimed is:

1. A simulation device, comprising:
    a drawing unit configured to draw a virtual facility corresponding to a facility in a virtual space, the virtual facility having a virtual movable portion corresponding to a movable portion of the facility; and
    a calculation unit configured to compute a physical quantity including a moment of inertia acting on the movable portion when operating the movable portion and to repeatedly calculate an operation speed of the virtual movable portion using the calculated physical quantity;
    wherein the drawing unit draws a motion of the virtual movable portion using the calculated operation speed of the virtual movable portion.

2. The simulation device according to claim 1, wherein the physical quantity further includes gravity acting on the movable portion and a frictional force acting on the movable portion when operating the movable portion.

3. The simulation device according to claim 1, wherein the drawing unit draws a change in the operation speed of the virtual movable portion during an operation time of the virtual movable portion.

4. A simulation system, comprising:
    a control device configured to output a control signal for driving a movable portion of a facility;
    a drawing unit configured to draw a virtual facility corresponding to the facility in a virtual space, the virtual facility having a virtual movable portion corresponding to the movable portion; and
    a calculation unit configured to compute, based on the control signal, a physical quantity including a moment of inertia acting on the movable portion when operating the movable portion and repeatedly calculate an operation speed of the virtual movable portion using the calculated physical quantity;
    wherein the drawing unit draws a motion of the virtual movable portion using the calculated operation speed of the virtual movable portion,
    wherein the calculation unit outputs the calculated operation speed of the virtual movable portion to the control device, and
    wherein the control device generates the control signal reflecting the input operation speed of the virtual movable portion to a drive of the movable portion.

5. A simulation method, comprising:
    calculating a physical quantity including a moment of inertia acting on a movable portion of a facility when operating the movable portion;
    repeatedly calculating an operation speed of a virtual movable portion in a virtual facility using the calculated physical quantity, the virtual facility having the virtual movable portion corresponding to the movable portion; and drawing a motion of the virtual movable portion in a virtual space using the calculated operation speed of the virtual movable portion.

\* \* \* \* \*